United States Patent
Yamamoto et al.

(10) Patent No.: US 8,178,069 B2
(45) Date of Patent: May 15, 2012

(54) BASIC MAGNESIUM SULFATE GRANULE, AND PROCESS FOR PRODUCTION THEREOF

(75) Inventors: Shinichi Yamamoto, Yamaguchi (JP); Akifumi Sekitani, Yamaguchi (JP)

(73) Assignee: Ube Material Industries, Ltd., Ube-shi, Yamaguchi (JP)

( * ) Notice: Subject to any disclaimer, the term of this patent is extended or adjusted under 35 U.S.C. 154(b) by 57 days.

(21) Appl. No.: 12/989,834

(22) PCT Filed: Apr. 28, 2009

(86) PCT No.: PCT/JP2009/058344
§ 371 (c)(1),
(2), (4) Date: Oct. 27, 2010

(87) PCT Pub. No.: WO2009/133881
PCT Pub. Date: Nov. 5, 2009

(65) Prior Publication Data
US 2011/0042297 A1    Feb. 24, 2011

(30) Foreign Application Priority Data
Apr. 28, 2008  (JP) .................. 2008-117283

(51) Int. Cl.
*B01J 19/00*   (2006.01)
*C01F 5/40*    (2006.01)

(52) U.S. Cl. ........................................ 423/554; 422/129
(58) Field of Classification Search ............. 423/554; 422/129
See application file for complete search history.

(56) References Cited

U.S. PATENT DOCUMENTS

2011/0042297 A1 *   2/2011   Yamamoto et al. ........... 210/263

\* cited by examiner

*Primary Examiner* — Timothy Vanoy
(74) *Attorney, Agent, or Firm* — Nixon Peabody LLP; Jeffrey L. Costellia

(57) ABSTRACT

Basic magnesium sulfate granules having a bulk density of 0.5-1.0 $g/cm^3$, a mean crushing strength of 700-900 g and a water content of 3 wt. % or less which comprises agglomerated particles of fibrous basic magnesium sulfate particles and fibrous xonotolite particles in a weight ratio of 95:5 to 70:30, wherein the fibrous basic magnesium sulfate particles have a mean length of 5-200 μm and a mean thickness of 0.2-1.0 μm and the fibrous xonotolite particles have a mean length less than that of the fibrous magnesium sulfate particles. The basic magnesium sulfate granules can be produced by drying a water-containing granular composition comprising agglomerated particles of fibrous basic magnesium sulfate particles and fibrous xonotolite particles which have a water content of 40 to 60 wt. % for 36 hours or more, thereby obtaining a granular composition having a water content of 3 wt. % or less.

7 Claims, 1 Drawing Sheet

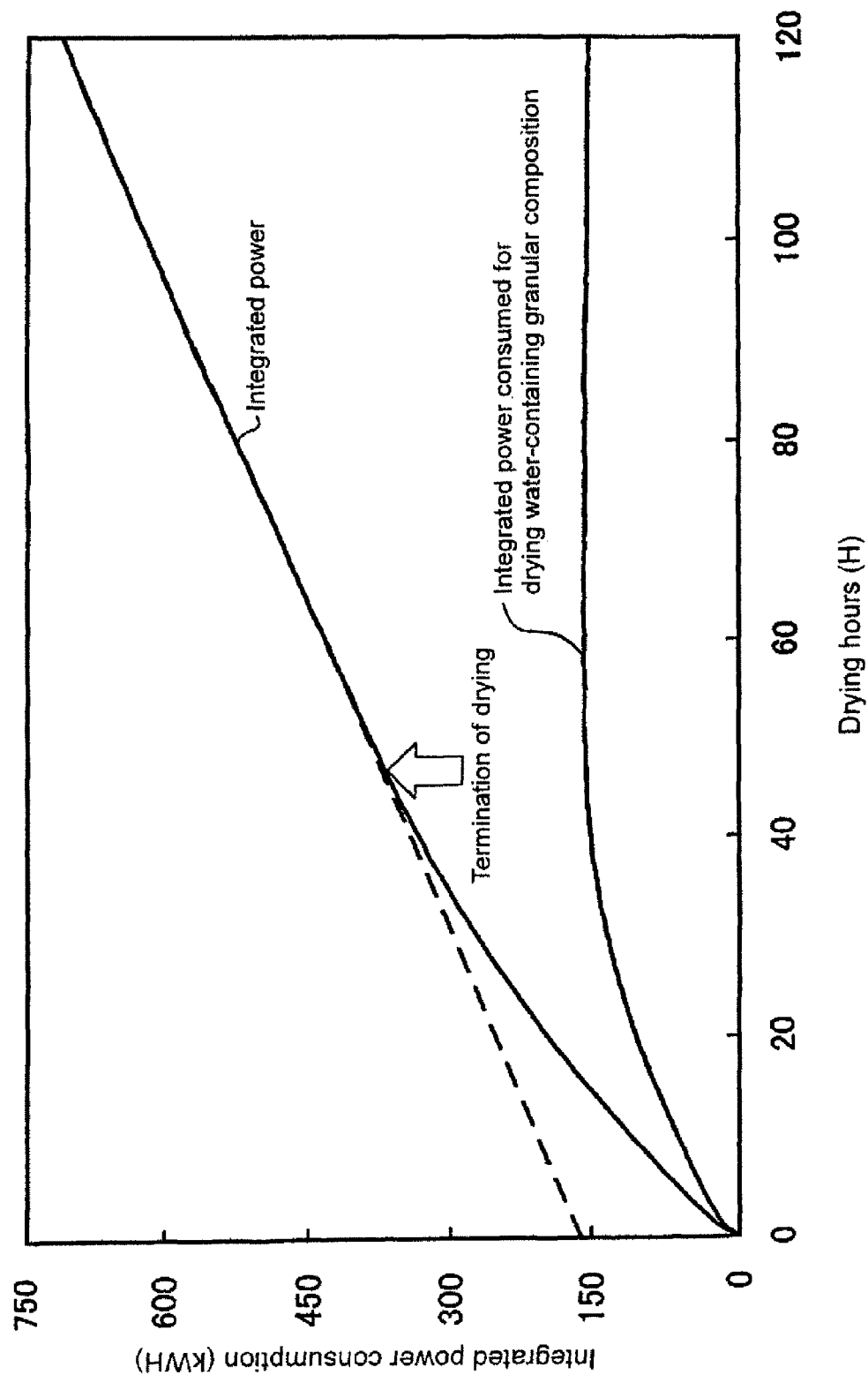

BASIC MAGNESIUM SULFATE GRANULE, AND PROCESS FOR PRODUCTION THEREOF

FIELD OF THE INVENTION

The present invention relates to basic magnesium sulfate granules favorably employable particularly for processing wastewater, and a method their production.

BACKGROUND OF THE INVENTION

Basic magnesium sulfate [$MgSO_4 \cdot 5Mg(OH)_2 \cdot 3H_2O$] can be utilized as wastewater-processing material. This utilization is disclosed in the following published documents.

JP 6-226017A discloses a method for removing fine particles and oil from wastewater by means of basic magnesium sulfate granules which comprise granulated plural fibrous basic magnesium sulfate particles. This publication describes a method comprising bringing wastewater containing fine particles and oil into contact with basic magnesium sulfate granules to produce aggregated masses and removing the aggregated masses from the wastewater by filtering for the fine particle-aggregated masses and by floating the oil-agglomerated masses.

JP 2005-231927A discloses basic magnesium sulfate granules comprising agglomerated composition comprising plural fibrous basic magnesium sulfate particles which are bonded to each other by a fibrous inorganic compound such as xonotolite or sepiolite or a fibrillated polytetrafluoroethylene. The basic magnesium sulfate granules are stated to be valuable as wastewater-processing material because the basic magnesium sulfate granules show improved structural stability, as compared with basic magnesium sulfate granules having no binding material. This publication further describes that the basic magnesium sulfate can be used for removing silica and lead by way of adsorption.

JP 2003-47972A describes a method of removing fluorine from wastewater discharged from desulfurization apparatuses which comprises employing magnesium sulfate as the absorbent in the desulfurization apparatus and adding sodium hydroxide to the wastewater discharged the desulfurization apparatus, thereby producing fluorine-absorbed basic magnesium sulfate and magnesium hydroxide.

As is described above, the granules composed of fibrous basic magnesium sulfate particles are valuable as wastewater-processing material because the granules can cause aggregation of fine particles and oil in wastewater and removing heavy metals and fluorine by way of adsorption. The basic magnesium sulfate granules for the use as wastewater-processing material preferably show appropriate characteristics such as a low bulk density that means presence of vacant space within the granules so that water easily enter the vacant space of the granules; and a high strength that means a high structural stability in water so that the granules are resistant to deintegration which results in dispersion of fibrous particles in running water.

As a result of studies, the present inventors have noted that the known basic magnesium sulfate granules do not show high strength enough for the employment as wastewater-processing material and that the granules should have increased strength.

SUMMARY OF THE INVENTION

Accordingly, it is an object of the invention to provide basic magnesium sulfate granules having a low bulk density and a high strength. It is another object to provide a method for producing the improved basic magnesium sulfate granules.

The present inventors have found that basic magnesium sulfate granules having such a low bulk density as 0.5 to 1.0 $g/cm^3$ and such a high mean crushing strength as 700 to 900 g can be produced by a method comprising drying a water-containing granular composition comprising agglomerated particles having a water content of 40 to 60 wt. % for a period of 36 hours or more, particularly a period of 36 to 100 hours, thereby obtaining a granular composition having a water content of 3 wt. % or less, in which the agglomerated particles comprise fibrous basic magnesium sulfate particles and fibrous xonotolite particles in a weight ratio of 95:5 to 70:30, wherein the fibrous basic magnesium sulfate particles have a mean length of 5 to 200 μm and a mean thickness of 0.2 to 1.0 μm and the fibrous xonotolite particles have a mean length less than that of the fibrous magnesium sulfate particles. The present invention has been made on the above-mentioned finding.

Accordingly, the present invention resides in basic magnesium sulfate granules having a bulk density of 0.5 to 1.0 $g/cm^3$, a mean crushing strength of 700 to 900 g and a water content of 3 wt. % or less which comprises agglomerated particles comprising fibrous basic magnesium sulfate particles and fibrous xonotolite particles in a weight ratio of 95:5 to 70:30, wherein the fibrous basic magnesium sulfate particles have a mean length of 5 to 200 μm and a mean thickness of 0.2 to 1.0 μm and the fibrous xonotolite particles have a mean length less than that of the fibrous magnesium sulfate particles.

Preferred basic magnesium sulfate granules of the invention are stated below.

(1) The basic magnesium sulfate granules have a mean diameter in the range of 0.5 to 30 mm.

(2) The basic magnesium sulfate granules, in which the fibrous xonotolite particles have a mean length of 1.0 to 4.0 μm and a mean thickness of 0.05 to 0.4 μm.

The invention further resides in a method for producing the basic magnesium sulfate granules of the invention, which comprises drying a water-containing granular composition comprising agglomerated particles having a water content of 40 to 60 wt. % for a period of 36 hours or more, particularly a period of 36 to 100 hours, thereby obtaining a granular composition having a water content of 3 wt. % or less, in which the agglomerated particles comprise fibrous basic magnesium sulfate particles and fibrous xonotolite particles in a weight ratio of 95:5 to 70:30, wherein the fibrous basic magnesium sulfate particles have a mean length of 5 to 200 μm and a mean thickness of 0.2 to 1.0 μm and the fibrous xonotolite particles have a mean length less than that of the fibrous magnesium sulfate particles.

The invention furthermore resides in a material for processing wastewater, which comprises the basic magnesium sulfate granules of the invention.

The invention furthermore resides in an apparatus for processing wastewater, which contains the basic magnesium sulfate granules of the invention in a column.

EFFECTS OF THE INVENTION

The methods of the invention make it possible to produce basic magnesium sulfate granules having a low bulk density and a high mean crushing strength advantageously employable in industry.

The basic magnesium sulfate granules of the invention has a low bulk density and a high mean crushing strength, and hence are of value as wastewater-processing material.

BRIEF DESCRIPTION OF ATTACHED DRAWING

FIGURE is a graph showing a relationship between a drying period and an integrated power consumption of a dryer which is observed in the step of drying a water-containing granular composition according to the method of the invention.

EMBODIMENTS OF THE INVENTION

The basic magnesium sulfate granules of the invention comprises agglomerated particles comprising fibrous basic magnesium sulfate particles and fibrous xonotolite particles in a weight ratio of 95:5 to 70:30, wherein the fibrous basic magnesium sulfate particles have a mean length of 5 to 200 µm and a mean thickness of 0.2 to 1.0 µm and the fibrous xonotolite particles have a mean length less than that of the fibrous magnesium sulfate particles.

The basic magnesium sulfate granules of the invention have a bulk density in the range of 0.5 to 1.0 g/cm$^3$ which is lower than the true density (i.e., 2.3 g/cm$^3$) of the basic magnesium sulfate by approx. 22 to 43%. This means that the granules have large vacant space inside thereof. Nevertheless, the basic magnesium sulfate granules of the invention have a high mean crushing strength such as 700 to 900 g. The bulk density is determined by the Archimedes's method. The mean crushing strength is a mean value of crushing strengths determined on optionally selected five granules. The crushing strength of the granules is determined by the method defined in JIS-Z-8841 (for Granules—Method for determination of strength (1993)).

The basic magnesium sulfate granules of the invention have a water content of 3 wt. % or less, preferably in the range of 0.1 to 3 wt. %. The water content is expressed in terms of percentage of loss of drying the granules at 180° C., based on the pre-heated granules. The water content can be determined by means of an infrared water-content analyzer (FD-800, available from Kett Electric Laboratory Co., Ltd.).

The basic magnesium sulfate granules of the invention preferably have a mean granule diameter in the range of 0.5 to 30 mm, more preferably in the range of 1 to 4 mm. There are no specific limitation with respect to shape of the agglomerated particles of the basic magnesium sulfate granules of the invention. Therefore, the basic magnesium sulfate granules of the invention can take optional shapes such as globe, cylinder, almond, and flake.

The basic magnesium sulfate granules of the invention can be produced, for instance, by drying a water-containing granular composition comprising agglomerated particles having a water content of 40 to 60 wt. % for a period of 36 hours or more, particularly a period of 36 to 100 hours, thereby obtaining a granular composition having a water content of 3 wt. % or less, in which the agglomerated particles comprise fibrous basic magnesium sulfate particles and fibrous xonotolite particles in a weight ratio of 95:5 to 70:30, wherein the fibrous basic magnesium sulfate particles have a mean length of 5 to 200 µm and a mean thickness of 0.2 to 1.0 µm and the fibrous xonotolite particles have a mean length less than that of the fibrous magnesium sulfate particles.

The fibrous xonotolite particles preferably have a mean length of 1.0 to 4.0 µm and a mean thickness of 0.05 to 0.4 µm. It is preferred that the mean length of the fibrous xonotolite particles is in the range of 5 to 20% of the mean length of the fibrous basic magnesium sulfate particles. It is noted that the fibrous xonotolite particles are cleavable and hence are apt to be broken when the xonotolite particles are mixed with the fibrous basic magnesium sulfate particles for producing the desired granules.

The water content of the water-containing granular composition preferably is in the range of 45 to 55 wt. %.

The water-containing granular composition can be produced by the steps of dispersing a mixture of fibrous basic magnesium sulfate particles and fibrous xonotolite particles in water to obtain a mixture-containing slurry, subjecting the mixture-containing slurry to filtration to give a water-containing composition, and molding the water-containing composition in the form of granules. The water-containing composition can be molded by a known molding procedure such as extrusion molding, compression molding or rolling granulation.

Alternatively, the water-containing granular composition can be produced by the steps of charging a mixture of the fibrous basic magnesium sulfate particles and fibrous xonotolite particles into a rolling granulation apparatus and granulating the mixture under addition of water therein.

The water-containing granular composition can be dried, generally, at a temperature in the range of 50 to 200° C.

The period of drying the water-containing granular composition can be adjusted in consideration of the conditions set in the dryer, for instance, the drying temperature and divergence of the pumping dumper, and the amount of the water-containing granular composition in the dryer.

The period of drying the water-containing granular composition can be checked by monitoring the electric power consumption of the dryer. For instance, the water-containing granular composition placed in a dryer is dried under predetermined conditions, while the integrated electric power consumption of the dryer is checked. The drying period and integrated electric power consumption are then plotted to give a graph showing a relationship between the drying period and the integrated electric power consumption of the dryer, as shown in FIGURE. In FIGURE, the solid line of the integrated power consumption means an integrated amount of the power consumption of the dryer, while the dotted line is an approximated straight line prepared by approximation of the linear portion of the integrated power consumption. The inclination of the approximated straight line shows thermal energy loss of the dryer, and an intercept thereof shows an amount of electric power consumed for drying the water-containing granular composition (for evaporating water). Therefore, the integrated power consumed predominantly for the dryness of the water-containing granular composition can be determined by reducing the thermal loss of the dryer obtained from the inclination of the approximated line from the integrated power consumption. When the integrated power consumption required predominantly for drying the water-containing granular composition reaches an invariable value, the water-containing granular composition is completely dried. The period of drying the water-containing granular composition, that is, the period for the time at which the integrated power consumed predominantly for the dryness of the water-containing granular composition reaches an invariable value, preferably is longer than 36 hours, more preferably 40 hours.

The basic magnesium sulfate granules of the invention is in the form of a network structure of a low density, said network structure being composed of fine fibers. Therefore, the wastewater under processing easily flows into the inner space of the granules, and hence the aggregation of fine particles and oil in wastewater is accelerated. In addition, since the basic magnesium sulfate granules of the invention have a high mean crushing strength, the granules show high dimensional stability in water. Accordingly, the basic magnesium sulfate granules of the invention are advantageously employable as wastewater-processing material.

The basic magnesium sulfate granules can be placed in a column of a wastewater processing apparatus. The apparatus is placed in a discharging conduit of wastewater for removing heavy metals such as lead and fluorine from wastewater by absorption stably for a long period of time or removing fine particles and oil from wastewater by aggregation stably for a long period of time.

EXAMPLES

Example

A fibrous basic magnesium sulfate slurry (11,000 kg) in which fibrous basic magnesium sulfate particles having a mean length of 12 μm and a mean thickness of 0.4 μm were dispersed in water to give a dispersion having a particle concentration of 1.8 wt. %. In the fibrous basic magnesium sulfate slurry was placed 49.5 kg of a xonotolite powder having a mean length of 1.4 μm and a mean thickness of 0.2 μm, and the resulting mixture was stirred to give a uniform mixture-containing slurry. The mixture-containing slurry was filtered under vacuum to recover a solid portion. The solid portion was washed with water, dehydrated under pressure and extruded from a meat chopper to give 479 kg of a water-containing granular composition having a water content of 50.5 wt. %.

The resulting water-containing granular composition (479 kg, water content: 242 kg) was placed in a 3,000 L-volume jumbo oven (output: 24 kW) and dried for 50 hours to give granules having a water content of 3 wt. %.

The bulk density and mean crushing strength of the resulting granules were 0.71 g/cm$^3$ and 820 g, respectively, which were determined by the below-stated methods.

[Determination of Bulk Density]

The bulk density is measured in accordance of the "JSPS Method 2. Method for Determining Apparent Porosity, Apparent Specific Gravity and Bulk Density of Magnesia Clinker" given in Pocket Book for Refractories (1981 Edition) established by the 124 Test Method Studying Committee of the Japan Society for the Promotion of Science. The measured values are processed by the following equation to obtain the bulk density:

Bulk Density=$S \times W1/(W3-W2)$

W1: weight (g) of test sample after dryness
W2: weight (g) of test sample saturated with white kerosine in the white kerosine
W3: weight (g) of test sample saturated with white kerosine
S: specific gravity (g/cm$^3$) of the white kerosine at a temperature for the measurement

[Determination of Crushing Strength]

Five sample granules are optional taken. Each granule is compressed in an automatic tester autograph AG-1 (available from Shimazu Corporation, Ltd.) by moving a pressing member at a rate (cross head rate) of 0.5 mm/min. The load (test force, unit: N) applied to the sample granule is measured in progress of time. From the variation of the test force in progress of time, the first peak is read and its value is converted into a load (g). The mean crushing strength is obtained from a mean value of the crushing strengths measured on five sample granules.

Comparison Example

The procedures of Example were repeated except that the period for reducing the water-containing granular composition to 3 wt. % was changed to 24 hours, to produce basic magnesium sulfate granules.

The bulk density and mean crushing strength of the resulting granules which were determined by the aforementioned methods were 0.69 g/cm$^3$ and 670 g, respectively.

What is claimed is:

1. Basic magnesium sulfate granules having a bulk density of 0.5 to 1.0 g/cm$^3$, a mean crushing strength of 700 to 900 g and a water content of 3 wt. % or less which comprises agglomerated particles comprising fibrous basic magnesium sulfate particles and fibrous xonotolite particles in a weight ratio of 95:5 to 70:30, wherein the fibrous basic magnesium sulfate particles have a mean length of 5 to 200 μm and a mean thickness of 0.2 to 1.0 μm and the fibrous xonotolite particles have a mean length less than that of the fibrous magnesium sulfate particles.

2. The basic magnesium sulfate granules of claim 1 which have a mean diameter in the range of 0.5 to 30 mm.

3. The basic magnesium sulfate granules of claim 1, in which the fibrous xonotolite particles have a mean length of 1.0 to 4.0 μm and a mean thickness of 0.05 to 0.4 μm.

4. A method for producing the basic magnesium sulfate granules of claim 1, which comprises drying a water-containing granular composition comprising agglomerated particles having a water content of 40 to 60 wt. % for a period of 36 hours or more, thereby obtaining a granular composition having a water content of 3 wt. % or less, in which the agglomerated particles comprise fibrous basic magnesium sulfate particles and fibrous xonotolite particles in a weight ratio of 95:5 to 70:30, wherein the fibrous basic magnesium sulfate particles have a mean length of 5 to 200 μm and a mean thickness of 0.2 to 1.0 μm and the fibrous xonotolite particles have a mean length less than that of the fibrous magnesium sulfate particles.

5. The method of claim 4, in which the period for drying to obtain the granular composition having a water content of 3 wt. % or less is in the range of 36 to 100 hours.

6. A material for processing wastewater, which comprises the basic magnesium sulfate granules of claim 1.

7. An apparatus for processing wastewater, which contains the basic magnesium sulfate granules of claim 1 in a column.

* * * * *